United States Patent [19]

Hayes

[11] 3,935,244

[45] *Jan. 27, 1976

[54] HIGH PRESSURE REGENERATION OF A COKE-DEACTIVATED CATALYST CONTAINING PLATINUM, RHENIUM, HALOGEN & SULFUR

[75] Inventor: John C. Hayes, Palatine, Ill.

[73] Assignee: Universal Oil Products Company, Des Plaines, Ill.

[ * ] Notice: The portion of the term of this patent subsequent to Nov. 23, 1988, has been disclaimed.

[22] Filed: May 3, 1971

[21] Appl. No.: 139,911

Related U.S. Application Data

[63] Continuation-in-part of Ser. No. 844,200, July 23, 1969, Pat. No. 3,622,520, which is a continuation-in-part of Ser. No. 805,380, March 7, 1969, abandoned.

[52] U.S. Cl. .................. 252/415; 208/140; 252/419
[51] Int. Cl.² ................... B01J 23/96; C10G 35/08
[58] Field of Search .................... 252/415, 416, 419; 208/140

[56] References Cited
UNITED STATES PATENTS

| 3,481,861 | 12/1969 | Hayes | 208/140 |
|---|---|---|---|
| 3,496,096 | 2/1970 | Kluksdahl | 252/419 |
| 3,617,520 | 11/1971 | Kluksdahl | 208/138 |
| 3,622,520 | 11/1971 | Hayes | 252/415 |

FOREIGN PATENTS OR APPLICATIONS

| 2,030,321 | 12/1970 | Germany | 252/416 |
|---|---|---|---|
| 2,030,352 | 1/1971 | Germany | 252/415 |

Primary Examiner—Winston A. Douglas
Assistant Examiner—P. E. Konopka
Attorney, Agent, or Firm—James R. Hoatson, Jr.; Thomas K. McBride; William H. Page, II

[57] ABSTRACT

A deactivated hydrocarbon conversion catalyst, which is a combination of a platinum group component, a rhenium component, a halogen component, and a sulfur component with a porous carrier material and which has been deactivated by deposition of carbonaceous material thereon during a previous contacting with a hydrocarbon charge stock at hydrocarbon conversion conditions, is regenerated by the sequential steps of: (1) stripping the sulfur therefrom by contacting with a first gaseous mixture comprising hydrogen, $H_2O$, and HCl; (2) purging hydrogen from contact with the catalyst with an inert gas stream; (3) burning carbon from the resulting catalyst at a relatively low temperature and a relatively high pressure with a substantially sulfur-free second gaseous mixture containing relatively small amounts of oxygen, $H_2O$, and HCl; (4) treating the resulting catalyst with the second gaseous mixture at a relatively high temperature and pressure; (5) purging oxygen from contact with the catalyst with an inert gas stream; and, (6) reducing the resulting catalyst by contacting with a substantially sulfur-free third gaseous mixture comprising hydrogen, $H_2O$, and HCl. Key feature of the regeneration method involves the use of both $H_2O$ and HCl in the gaseous mixtures used in the four major steps thereof (i.e., steps (1), (3), (4), and (6)). Furthermore, in all of these steps the mole ratio of $H_2O$ to HCl in the gas streams is maintained at a value selected from the range of about 20:1 to about 100:1.

13 Claims, No Drawings

HIGH PRESSURE REGENERATION OF A COKE-DEACTIVATED CATALYST CONTAINING PLATINUM, RHENIUM, HALOGEN & SULFUR

CROSS-REFERENCES TO RELATED APPLICATIONS

This application is a continuation-in-part of my prior, copending application Ser. No. 844,200 now issued as U.S. Pat. 3,622,520 which was filed July 23, 1969 which in turn is a continuation-in-part of my prior application Ser. No. 805,380 filed Mar. 7, 1969 now abandoned.

The subject of the present invention is a high pressure method for regenerating a coke-deactivated hydrocarbon conversion catalyst comprising a combination of a platinum group component, a rhenium component, a halogen component, and a sulfur component with a porous carrier material. Typically, the catalyst has been deactivated by the deposition of carbonaceous materials thereon during a previous contacting with a hydrocarbon charge stock at an elevated temperature. In essence, the present invention provides a specific sequence of carbon-burning and catalyst-treatment steps which are all conducted with gas streams containing $H_2O$ and HCl in a mole ratio of about 20:1 to about 100:1 and which are specifically designed to result in a regenerated catalyst possessing activity, selectivity, and stability characteristics which are equivalent to those observed with a fresh, undeactivated catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as one or more of the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this latter type of process is reforming wherein a hydrocarbon feed stream containing paraffins and naphthenes is subjected to conditions which promote dehydrogenation of naphthenes to aromatics, isomerization of paraffins and naphthenes, hydrocracking of naphthenes and paraffins and the like reactions, to produce an octane-rich and aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform the specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used -- that is, the temperature, pressure, contact time, and presence of diluents such as $H_2$; (2) selectivity refers to the amount of desired product or products obtained relative to the amount of reactants converted or charged; (3) stability refers to the rate of change with time of the activity and selectivity parameters -- obviously the smaller rate implying the more stable catalyst. In a reforming process, for example, activity commonly refers to the amount of conversion that takes place for a given charge stock at a specified severity level and is typically measured by octane number of $C_5+$ product stream; selectivity refers to the amount of $C_5+$ yield that is obtained at the particular severity level; and stability is typically equated to the rate of change with time of activity, as measured by octane number of $C_5+$ product and of selectivity as measured by $C_5+$ yield. Actually, the last statement is not strictly correct because generally a continuous reforming process is run to produce a constant octane $C_5+$ product with a severity level being continuously adjusted to attain this result; and, furthermore, the severity level is for this process usually varied by adjusting the conversion temperature in the reaction zone so that, in point of fact, the rate of change of activity finds response in the rate of change of conversion temperature and changes in this last parameter are customarily taken as indicative of activity stability.

As is well known to those skilled in the art, the principal cause of observed deactivation or instability of these dual-function catalysts, when they are used in a hydrocarbon conversion process, is associated with the formation of coke or carbonaceous materials on the surface of the catalyst during the course of the reaction. More specifically, the conditions utilized in these hydrocarbon conversion processes typically result in the formation of heavy, black, solid or semi-solid carbonaceous material which deposit on the surface of the catalyst and gradually reduce its activity by shielding its active sites from the reactants. Recently, there has been developed a new dualfunction bimetallic catalytic composite which possesses improved activity, selectivity, and stability characteristics when it is employed in a process for the conversion of hydrocarbons of the type which has heretofore utilized dualfunction catalytic composites such as processes for isomerization, dehydrogenation, hydrogenation, alkylation, transalkylation, dealkylation, cyclization, dehydrocyclization, cracking, hydrocracking, reforming, and the like processes. In particular, it has been determined that the use of catalyst comprising a combination of a platinum group component, a rhenium component, and a halogen component with a porous carrier material can enable the performance of hydrocarbon conversion processes utilizing dual-function catalysts to be substantially improved. For example, it has been demonstrated that the overall performance characteristics of a reforming process can be sharply improved by the use of this recently developed bimetallic catalytic composite. Not unexpectedly, the deactivation of this bimetallic catalyst occurs in much the same manner as for any other hydrocarbon conversion catalyst having a platinum metal component when it is employed in the hydrocarbon conversion service. Accordingly, the principal mode of deactivation of this recently developed bimetallic catalyst is the deposition of coke, volatile hydrocarbons, and other carbonaceous material on the surface of the catalyst which eventually cover the catalytically active sites of the catalyst thereby shielding them from the reactants or blocking access of the reactants to the sites. These deposits cause a gradual decline in activity and selectivity of the catalyst and a gradual loss of its capability to perform its intended function. Depending somewhat on the performance requirements imposed on the process utilizing the catalyst, at some point in time the catalyst becomes so clogged with carbonaceous materials that it either must be regenerated or discarded. Heretofore, substantial difficulty has been encountered in regenerating this recently developed bimetallic hydrocarbon conversion catalyst. More specifically, it has been determined that the application of conventional regeneration techniques, which have long been practiced in the art of regenerating dual-function hydrocarbon conversion catalysts, has not been successful in restoring the initial activity, selectivity, and stability characteristics of this bimetallic catalyst. Typically, attempts at regeneration of this catalyst by a conventional carbon-burning procedure with an oxygen-containing gas has resulted in a regenerated catalyst having an extremely low activity for the conversion of hydrocarbons, and containing a substantially reduced amount of halogen. Attempts at restoring the initial level of halogen contained in the catalyst by well known halogen-adjustment procedures on the regenerated catalyst have been uniformly unsuccessful. When the deactivated catalyst also contains a sulfur component, I have established that this regeneration problem is greatly magnified and compounded. More specifically, when this recently developed bimetallic catalyst has been exposed to contact with sulfur or sulfur-containing compounds, either because of presulfiding, because of the presence of sulfur in the charge stock, or because of upsets in a treating process used on the charge stock therefor, the response of the resulting sulfur-containing catalyst to a conventional carbon-burning regeneration procedure is completely negative, and the catalyst is thereby permanently deactivated. In other words, this catalyst is acutely sensitive to the procedure used to regenerate even when it does not contain sulfur, and when sulfur is present, the already difficult regeneration problem increases by an order of magnitude. This discussion of the regeneration problem caused by sulfur is not to be construed as an allegation that the presence of sulfur in the charge stock causes a mode of catalyst deactivation which is independent of the carbon deposition mode explained previously; quite on the contrary, the presence of sulfur in the charge stock can in some cases be highly beneficial. Upon investigation, it appears that the adverse effect of sulfur is primarily associated with the production during regeneration of sulfur oxides which are preferentially retained by the catalyst.

Based upon my recognition of the acute sensitivity of this catalyst to the presence of sulfur or sulfur oxides during the course of the regeneration procedure, I previously determined that a particularly advantageous method of regeneration involves the substantially complete removal of sulfur from this catalyst prior to the burning of carbon therefrom, coupled with careful control of the gas streams used in the various steps of the regeneration method to exclude therefrom sulfur or sulfur oxides. Moreover, I ascertained that it is particularly beneficial to conduct each of the major steps of the regeneration method with gas streams containing both $H_2O$ and HCl in a mole ratio of $H_2O$ to HCl selected from the range of about 20:1 to about 100:1. I have now found that it can be quite advantageous to regenerate this bimetallic with a relatively high pressure in the carbon-burning and oxygen treatment steps. More precisely, I have now found a specific sequence of steps which enables the successful regeneration of this sulfurcontaining catalyst, and essential features of my method are: substantially complete removal of sulfur prior to burning of any carbon from the catalyst; careful control of the temperature of the catalyst throughout the regeneration steps; exclusion of sulfur or sulfur oxides from the gas streams used in all steps; presence of both $H_2O$ and HCl in the gas streams used in the major steps thereof (i.e., the sulfurstripping step, the carbon-burning step, the oxygen treatment step, and the final reduction step) in amounts sufficient to achieve a mole ratio of $H_2O$ to HCl of about 20:1 to about 100:1; use of relatively small amounts of oxygen in the carbonburning and oxygen-treating steps; and use of relatively high pressure in the carbon-burning and oxygen treatment steps.

It is, therefore, a principal object of the present invention to provide a method for regenerating a hydrocarbon conversion catalyst comprising a combination of a platinum group component, a rhenium component, a halogen component, and a sulfur component with a porous carrier material, which catalyst has been deactivated by contact with a hydrocarbon charge stock at elevated temperatures. A corollary object is to provide a solution to the problem of regenerating this sulfurcontaining catalyst which solution enables the substantial restoration of the activity, selectivity, and stability characteristics of the original catalyst. An overall object is to extend the total catalyst life of these recently developed catalysts and to obtain more efficient and effective use of these catalysts during their active life.

In brief summary, one embodiment of the present invention involves a method for regenerating a deactivated hydrocarbon conversion catalyst comprising a combination of a platinum group component, a rhenium component, a halogen component, and a sulfur component with a porous carrier material. The catalyst also contains a carbon component which was formed by deposition of carbonaceous material thereon during a previous contacting with a hydrocarbon charge stock at an elevated temperature. The first step of the method involves contacting the deactivated catalyst with a substantially sulfur-free first gaseous mixture consisting essentially of hydrogen, about 0.02 to about 3.6 mole % $H_2O$, and HCl at a temperature of about 350 to about 600° C. and at a pressure of about 1 to about 50 atmospheres for a period extending until the resulting effluent gas stream is substantially free of hydrogen sulfide. This first gaseous mixture contains $H_2O$ and HCl in amounts selected to result in a mole ratio of $H_2O$ to HCl of about 20:1 to about 100:1. Thereafter, hydrogen is purged from contact with the catalyst and it is subjected to contact with a substantially sulfur-free second gaseous mixture consisting essentially of an inert gas, $O_2$, $H_2O$, and HCl at a temperature of about 375 to about 450° C. and at a pressure of about 7 to about 35 atmospheres for a period of time sufficient to substantially remove the carbonaceous materials from the catalyst. Like the first mixture, this second gaseous mixture contains $H_2O$ to HCl in amounts selected to result in a mole ratio of $H_2O$ to HCl of about 20:1 to about 100:1; in addition, the amount of $O_2$ contained therein is about 0.2 to about 3 mole % thereof and the amount of $H_2O$ is about 0.03 to about 3.6 mole % thereof. After carbon is substantially removed from the catalyst, it is subjected to an oxygen-treating step involving contacting it with the second gaseous mixture for a period of at least about 0.5 to about 10 hours at a relatively high temperature of about 450° to about 550° C. and pressure of about 7 to about 35 atmospheres. Following this oxygen treatment step, oxygen is purged from contact with the catalyst with the inert gas stream. Thereafter, the catalyst is subjected to contact with a substantially sulfur-free third gaseous mixture consisting essentially of hydrogen, about 0.03 to about 3.5 mole % $H_2O$, and HCl at a temperature of about 300° to about 600° C. for a final period of at least about 0.5 to about 5 hours. Once again, this third gaseous mixture contains $H_2O$ and HCl in amounts sufficient to result in a mole ratio of $H_2O$ to HCl of about 20:1 to about 100:1. The regenerated catalyst recovered from this last step has activity, selectivity, and stability characteristics equivalent to those possessed initially by the fresh catalyst.

Some of the advantages associated with this method of catalyst regeneration are: (1) it can be completed in a relatively short time because of the relatively high pressure used in the carbon-burning and oxygen-treating steps; (2) it does not require a high concentration of oxygen in the gas stream used during the oxygen treatment step; (3) since all major steps are performed in the presence of water, expensive dryers and/or elaborate drying procedures are not necessary; (4) fairly low temperatures can be utilized in the reduction step; (5) the presence of chloride in the gas streams utilized in all of the major steps insures the automatic adjustment of the halogen component of the catalyst to the proper level; and, (6) the positive requirements for exclusion of sulfur from the gas streams utilized in each of these steps coupled with the initial sulfur-stripping step eliminates the possibility of damaging the catalyst due to exposure of sulfur or sulfur oxides as previously explained.

In a second embodiment, the present invention is a regeneration method as summarized above in the first embodiment wherein the oxygen-treating step comprises the substeps of: (a) treating the catalyst resulting from the carbon-burning step with the second gaseous mixture for at least about 0.5 to about 5 hours at a temperature of about 450 to about 550° C. and at a pressure of about 7 to about 35 atmospheres; and thereafter, (b) increasing the amount of $O_2$ contained in the second gaseous mixture by a factor of about 2 to about 50 and continuing the treating with this modified mixture for an additional period of at least about 0.5 to about 5 hours at the same temperature and pressure.

Another embodiment relates to the regeneration method described in the first embodiment wherein the ratio of $H_2O$ to HCl utilized in the sulfur-stripping step, the carbon-burning step, the oxygen treatment step and the reduction step is selected from the range of about 50:1 to about 90:1, and/or wherein the amount of oxygen contained in the second gaseous mixture is about 0.5 to about 1.5 mole percent thereof.

Other objects and embodiments of the present invention encompass further details about the type of bimetallic catalysts that can be regenerated thereby, the conditions and reagents used in each step of the regeneration method, and the mechanics associated with each of these steps. These embodiments and objects will be hereinafter disclosed in the following detailed description of each of the essential and preferred steps of the present invention.

The present invention encompasses a regeneration method which is applicable to a catalyst containing a platinum group component, a rhenium component, a halogen component and a sulfur component combined with a porous carrier material. Although the regeneration procedure is specifically directed to the regeneration of a composite containing platinum, it is intended to include within its scope other platinum group metals such as palladium, rhodium, ruthenium, osmium, and iridium. The platinum group component may be present in the catalyst as the elemental metal or as a suitable compound such as the oxide, sulfide, etc., although it is generally preferred that it be used in the reduced state. Generally, the amount of the platinum group metallic component present in the deactivated catalyst is small compared to the quantities of the other components combined therewith. In fact, the platinum group metallic component preferably comprises about 0.01 to about 1 wt. % of the deactivated catalyst calculated on a carbonaceous material-free and elemental basis. Excellent results are obtained when the catalyst contains about 0.1 to about 0.9 wt. % of the platinum group metal. The preferred platinum group component is platinum or a compound of platinum.

Another essential constituent of the catalyst regenerated by the method of the present invention is the rhenium component. This component may be present as an elemental metal or as a chemical compound such as the oxide, sulfide, halide, or in a physical or chemical association with the carrier material and/or other components of the catalyst. Generally, the rhenium component is utilized in an amount sufficient to result in the deactivated catalytic composite containing about 0.01 to about 1 wt. % rhenium, calculated on a carbonaceous-material free and elemental basis. The rhenium component may be incorporated in the catalytic composite in any simple manner and in any stage of the preparation of the catalyst. The preferred procedure for incorporating the rhenium component involves the impregnation of the carrier material either before, during or after the other components referred to herein are added. The impregnation solution is generally an aqueous solution of a suitable rhenium salt such as ammonium perrhenate, sodium perrhenate, potassium perrhenate, and the like salts. However, the preferred impregnation solution is an aqueous solution of perrhenic acid. The carrier material can, in general, be impregnated with the rhenium component either prior to, simultaneously with, or after the platinum group metallic component is added to the carrier. Best results are achieved when the rhenium compound is impregnated simultaneously with the platinum group metallic component. In fact, a preferred impregnation solution contains chloroplatinic acid, hydrogen chloride, and perrhenic acid.

Yet another essential ingredient of the deactivated catalyst regenerated by the present method is a halogen component. Although the precise form of the chemistry of the association of the halogen component with the carrier material is not entirely known, it is customary in the art to refer to the halogen component as being combined with the carrier material or with the other ingredients of the catalyst. This combined halogen may be either chlorine, fluorine, iodine, bromine, or mixtures thereof. Of these, chlorine and fluorine are preferred, with the best results obtained with chlorine. The halogen may be added to the carrier material in any suitable manner either during preparation of the support or before or after the addition of the platinum metal and rhenium components. The halogen component is typically combined with the carrier material in amounts sufficient to result in the deactivated catalyst containing about 0.1 to about 1.5 wt. % halogen and preferably about 0.7 to about 1.2 wt. % halogen calculated on a carbonaceous material-free basis.

The deactivated catalyst which is regenerated by the subject method also contains a sulfur component. A portion of this sulfur component may be derived from sulfur incorporated in the catalyst during a presulfiding operation with a suitable sulfur-containing compound such as hydrogen sulfide. Another source of the sulfur contained in the catalyst is the presence of sulfur or sulfur-containing compounds in the charge stock which is contacted with the subject catalyst at conversion conditions. Even in the best run plants, some sulfur may also be derived from plant hardware due to previous exposure of same to hydrogen sulfide. In some cases, sulfur may be deliberately injected into the hydrocarbon conversion process utilizing this catalyst in order to selectively poison same. Regardless of the source of sulfur, the catalyst regenerated by the method of the present invention will contain about 0.01 to about 5 wt. % sulfur, and, more commonly, about 0.05 to 1 wt. % sulfur, calculated on a carbonaceous material-free basis, when it is subjected to the method disclosed herein.

The catalyst regenerated by the method disclosed herein additionally contains a porous carrier material. Although any porous, refractory carrier material known to those skilled in this art may be used, the preferred material is a refractory inorganic oxide and, more specifically, alumina. This preferred alumina material is typically a porous, adsorptive, high surface area support having a surface area of about 25 to about 500 or more m²/g. Suitable alumina materials are the crystalline aluminas known as gamma-, eta-, and theta-alumina, with gamma- or eta-alumina giving best results. In addition, in some embodiments the alumina carrier material may contain minor proportions of other well known refractory inorganic oxides such as silica, zirconia, magnesia, etc. However, the preferred carrier material consists essentially of gamma- or eta-alumina; in fact, an especially preferred alumina carrier material has an apparent bulk density of about 0.3 g/cc to about 0.7 g/cc and surface area characteristics such that the average pore diameter is about 20 to about 300 Angstroms, pore volume is about 0.1 to about 1 ml/g and the surface area is about 100 to about 500 m²/g. An exemplary procedure for preparing a preferred alumina carrier material comprising spherical particles of relatively small diameter is given in the teachings of U.S. Pat. No. 2,620,314.

After impregnation of the catalytic components into the porous carrier material, the resulting composite is in the preferred method of preparing the type of bimetallic catalyst of interest here, typically subjected to a conventional drying step at a temperature of about 200° F. to about 600° F. for a period of about 2 to 24 hours. Thereafter, the dried composite is typically calcined at a temperature of about 700° F. to about 1100° F. in an air stream for a period of at least about 0.5 to 10 hours. Moreover, conventional prereduction and presulfiding treatments are typically performed in the preparation of catalytic composites which are regenerated by the method of the present invention. In fact, it is preferred to incorporate about 0.05 to about 0.5 wt. % of sulfur component into the subject catalyst by a conventional presulfiding step.

In one preferred embodiment, the catalyst regenerated by the present invention is a combination of a platinum component, a chlorine component, a rhenium component, and a sulfur component with an alumina carrier material. These components are preferably present in amounts sufficient to result in the catalyst containing, on an elemental and carbon-free basis, about 0.1 to 1.5 wt. % chlorine, about 0.01 to about 1 wt. % platinum, about 0.01 to about 1 wt. % rhenium, and about 0.05 to about 1 wt. % sulfur.

As indicated hereinbefore, the principal utility for this bimetallic catalyst is in a hydrocarbon conversion process wherein a dual-function hydrocarbon conversion catalyst having a hydrogenation-dehydrogenation function and an acid-acting function has been traditionally used; for example, these catalysts are used in a reforming process with excellent results. In a typical reforming process, a hydrocarbon charge stock boiling in the gasoline range and hydrogen are contacted with the catalyst of the type described above in a conversion zone at reforming conditions. The hydrocarbon charge stock will typically comprise hydrocarbon fractions containing naphthenes and paraffins that boil within the gasoline range. The preferred class of charge stocks include straight run gasolines, natural gasolines, synthetic gasolines, etc. The gasoline charge stock may be a full boiling range gasoline having an initial boiling point of about 50 to about 150° F., and an end boiling point within the range of about 325° to 425° F., or it may be a selective fraction thereof which generally will be a higher boiling fraction commonly referred to as a heavy naphtha -- for example, a naphtha boiling in the range of $C_7$ to 400° F. provides an excellent charge stock. In general, the conditions used in the reforming process are: a pressure of about 50 to about 1000 psig., with the preferred pressure being 100 to about 600 psig.; a temperature of about 800° to about 1100° F. and preferably about 900° to about 1050° F., a hydrogen to hydrocarbon mole ratio of about 2 to about 20 moles of $H_2$ per mole of hydrocarbon and preferably about 4 to about 10 moles of $H_2$ per mole of hydrocarbon; and a liquid hourly space velocity (which is defined as the equivalent liquid volume flow rate per hour of the hydrocarbon charge stock divided by the volume of the bed of catalyst particles) of about 0.1 to about 10 hr.$^{-1}$, with a value in the range of about 1 to about 3 hr.$^{-1}$ giving best results.

When the bimetallic catalysts of the type described above are employed in the conversion of hydrocarbons, particularly the reforming process outlined above, the activity, selectivity, and stability of these catalysts are initially quite acceptable. For example, in a reforming process this type of catalyst has several singular advantages, among which are increased $C_5+$ yield, decreased rate of coke laydown on the catalyst, increased hydrogen make, enhanced stability of both $C_5+$ yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about ½ to about 25 percent by weight of carbonaceous deposits have been formed upon the catalyst.

When the performance of the catalyst has decayed to the point where it is desired to regenerate the catalyst, the introduction of the hydrocarbon charge stock into the conversion zone containing the catalyst is typically stopped. Thereafter, the regeneration method of the present invention is performed either in situ or the catalyt may be unloaded from the conversion zone and regenerated in an off-line facility.

It is to be carefully noted that it is an essential feature of the subject regeneration method that the composition of the gas streams used in the various steps thereof are carefully controlled. In particular, it is a critical feature of the present invention that the gas streams used during the sulphur-stripping step, the carbon-burning step, the oxygen-treating step, and the reduction step are substantially free of compounds of sulfur -- particularly, oxides of sulfur and $H_2S$. It is, therefore, evident that the gas streams used in each of the steps of the present invention may be once-through streams or recycle streams; provided that in this latter case, the recycle streams are treated by conventional techniques to insure the absence of detrimental constituents therefrom. Furthermore, it is to be noted that the temperatures given hereinafter for each of the steps refer to the temperature of the gas stream used therein just before it contacts the catalyst, and that the composition of the gas streams utilized are given in mole percent which are, of course, substantially the same as when expressed in volume percent.

According to the present invention, the first step of the regeneration method involves subjecting the deactivated catalyst to contact with a substantially sulfurfree first gaseous mixture consisting essentially of hydrogen, $H_2O$, and HCl with an optional inert carrier gas such as nitrogen, at conditions selected to strip sulfur from the catalyst and associated hardware of the hydrocarbon conversion plant. This first gaseous mixture contains $H_2O$ and HCl in amounts, respectively, sufficient to result in a mole ratio of $H_2O$ to HCl of about 20:1 to about 100:1, with best results ordinarily obtained at a mole ratio of about 50:1 to about 90:1. In general, it is preferred to operate with a relatively minor amount of water in this first gaseous mixture, with best results obtained when the amount of water contained therein is sufficient to comprise about 0.02 to about 3.6 mole percent thereof. Accordingly, in a preferred mode of operation, the first gaseous mixture consists essentially of a hydrogen stream containing about 0.02 to about 3.6 mole percent water and about 0.0002 to about 0.18 mole percent HCl. It is to be noted, both herein and in the subsequent steps, that when reference is made to HCl being contained in the gas streams, it is intended to include both the situation where HCl per se is added to the gas streams and where a chloride-containing compound, which is convertible to hydrogen chloride under the conditions utilized in these steps, is added to these gas streams. Examples of these last compounds are chlorine, alkyl chlorides, ammonium chloride, carbon tetrachloride, and the like compounds.

This sulfur-stripping step is preferably conducted at a relatively high temperature of about 350° to about 600° C., with best results obtained at about 400° to 550° C. Similarly, the pressure utilized is about 1 to about 50 atmospheres, with best results obtained when a relatively high pressure is utilized in conjunction with a relatively high temperature. Likewise, the gas hourly space velocity can be selected from a relatively broad range, with a preferred value generally being about 100 to 25,000 hr.$^{-1}$ This sulfur-stripping step is performed for a period extending until the resulting effluent gas stream is substantially free of hydrogen sulfide: that is, less than about 10 vol. ppm. and preferably less than 1 vol. ppm. The hydrogen stream utilized in this step can be a once-through stream or a recycle stream provided, in the latter case, suitable arrangements are made to scrub $H_2S$ from the recirculated gas stream. An acceptable scrubbing procedure involves, for example, contacting the effluent gas stream with a strong basic solution such as an aqueous solution of an alkali metal or alkaline earth salt of a weak acid. A preferred scrubbing procedure for this step and subsequent steps involves scrubbing with a solution of sodium hydroxide which is maintained at a pH of about 8 to about 11. In a commercial hydrocarbon conversion plant, this scrubbing operation can easily be performed by circulating a basic solution from the hydrogen separator to the inlet to the effluent cooling means with suitable addition of fresh solution and withdrawal of spent solution to maintain the desired pH level.

This sulfur-stripping step is to be sharply distinguished from the conventional volatile hydrocarbon-stripping step which is ordinarily performed during the shutdown procedure when the catalyst has deactivated and is taken off stream. It is customary for platinum metal-containing catalysts to perform this volatile hydrocarbon-stripping step with a hydrogen-containing stream; however, the function of this stripping step is to remove volatile hydrocarbons and it is terminated when the effluent gas stream becomes free of same. Thus, this conventional stripping step ordinarily is completed in about .5 to about 2 hours. In sharp contrast, the sulfur-stripping step required by the present invention lasts until the effluent gas stream is substantially free of hydrogen sulfide, which is ordinarily a much longer period of about 15 to 30 hours, depending upon the exact stripping conditions utilized and the amount of sulfur initially on the catalyst.

Although it is not particularly preferred, an alternative mode of operation of this sulfur-stripping step involves contacting a substantially sulfur-free mixture of hydrogen, $H_2O$, HCl, and charge stock with the sulfur-containing catalyst at conditions selected to convert hydrocarbons and to strip sulfur. This contacting is usually performed with recycle gas scrubbing, as explained hereinbefore, for a period of time extending until the effluent stream from this contacting step is substantially free of hydrogen sulfide; that is, less than about 10 vol. ppm. and preferably less than 1 vol. ppm.

Following this sulfur-stripping step, residual hydrogen is removed from contact with the resulting catalyst by purging with an inert gas such as nitrogen. A preferred mode of operation for this purging step involves use of an inert gas stream that contains $H_2O$ and HCl in a mole ratio of about 20:1 to about 100:1.

After hydrogen is purged from contact with the catalyst, the next step involves burning carbon or coke from the resulting catalyst. This involves subjecting the sulfur-stripped catalyst to contact with a substantially sulfur-free second gaseous mixture consisting essentially of an inert gas oxygen, $H_2O$, and HCl at carbon-burning conditions. Preferably, the amount of oxygen contained in the second gaseous mixture is maintained within the range of about 0.2 to about 3 mole percent thereof, with best results obtained when it is about 0.5 to about 1.5 mole percent thereof. Similarly, it is necessary to maintain the mole ratio of $H_2O$ to HCl contained in this second gaseous mixture within the range of about 20:1 to about 100:1, with best results obtained at a ratio of about 50:1 to about 90:1. In addition, the amount of water contained in this second gaseous mixture preferably comprises about 0.03 to about 3.6 mole percent thereof. The balance of the gaseous mixture is an inert gas such as nitrogen, helium, carbon dioxide, etc. The conditions utilized in this carbon-burning step are: a temperature of about 375° to about 450° C., a pressure at least sufficient to maintain the flow of this second gaseous mixture through the zone containing the catalyst, and more specifically a relatively high pressure of about 7 to about 35 atmospheres, and a gas hourly space velocity (defined as the volume rate of flow of the gas stream per hour at standard conditions divided by the volume of the catalyst bed) of about 100 to about 25,000 hr.$^{-1}$ This carbon-burning step is performed for a time period at least sufficient to substantially remove carbonaceous materials from the catalyst. In general, depending obviously upon the amount of carbonaceous materials present on the catalyst, a carbon-burning period of about 5 to 30 hours is adequate, with good results typically obtained in about 20 to 30 or more hours. A convenient criterion for determining when this carbon-burning step is essentially complete involves monitoring the differential temperature across the reactor containing the catalyst and when this parameter is less than about 5° C. and more preferably less than 1° C. then the carbon-burning step for this reactor can be considered finished. For a multireactor system, the differential temperature across the last reactor in series would be the controlling parameter.

The next essential step of the regeneration method of the present invention is the oxygen treatment step and it involves treating the catalyst resulting from the carbon-burning step with the second gaseous mixture for a fourth period of at least about 0.5 to about 10 hours at a relatively high temperature. The temperature utilized in this step is selected from the range of about 450° to about 550° C. The other conditions are preferably selected from the ranges previously given in the discussion of the carbon-burning step. A preferred embodiment involves conducting this treatment step in two substeps: the first substep involving treating the catalyst resulting from the carbon-burning step with the second gaseous mixture for a period of at least about 0.5 to about 5 hours at a temperature of about 450° to about 550° C. and at a relatively high pressure of about 7 to about 35 atmospheres. The second substep then involves increasing the amount of oxygen contained in the second gaseous mixture by a factor of about 2 to about 50 and thereafter continuing the treating with this modified gaseous mixture for a period of at least about 0.5 to about 5 hours at the same relatively high temperature and pressure. The function of this oxygen-treating step is to remove trace amounts of carbonaceous materials which were not burned off during the first step and to convert the metallic components of the catalyst (i.e., the platinum group and rhenium components) to a highly oxidized state.

After this oxygen-treating step, oxygen is purged from contact with the resulting catalyst by means of a suitable inert gas stream. In view of the fact that the subsequent reduction step is conducted under a wet condition, it is not necessary to dry the plant during this step. All that is necessary is to displace oxygen from contact with the catalyst, and the period of time necessary to do this can easily be determined by monitoring the effluent gas stream from the zone containing the catalyst.

Upon completion of this last purge step, the final essential step, the reduction step, of the regeneration method is commenced. It involves contacting the resulting catalyst with a substantially sulfur-free third gaseous mixture consisting essentially of hydrogen, $H_2O$, and HCl with an optional inert carrier gas such as nitrogen, at a temperature of about 300° to about 600° C., with best results obtained at a relatively low temperature of 325° to 425° C., for a final period of at least about 0.5 to about 5 hours. As in the prior steps, the amounts of $H_2O$ and HCl in this third gaseous mixture are selected so that the mole ratio of $H_2O$ to HCl is about 20:1 to about 100:1, with best results obtained at about 50:1 to about 90:1. Similarly, the amount of $H_2O$ contained in this third gaseous mixture is preferably about 0.03 to about 3.6 mole percent thereof. In some cases, it is beneficial to conduct this reduction step in two substeps: the first involving using a mixture of nitrogen and hydrogen having a relatively low partial pressure of $H_2$ of about 0.5 to about 2 atmospheres, and the second involving a similar mixture having a relatively higher partial pressure of $H_2$ of about 5 to about 10 atmospheres. Once again, the pressure and gaseous flow rates utilized for this step are preferably identical to those given in conjunction with the discussion of the carbon-burning step. The purpose of this reduction step is to reduce the metallic components of the bimetallic catalyst essentially to an elemental state, thereby producing a regenerated catalyst having activity, selectivity, and stability characteristics comparable to those possessed initially by the fresh catalyst.

In many cases, it is advantageous to subject the regenerated catalyst obtained from the reduction step to an additional sulfiding treatment before it is returned to hydrocarbon conversion service. Although any method known to the art for sulfiding a catalyst can be utilized, the preferred procedure involves contacting a suitable sulfide-producing compound with the reduced catalyst at a temperature of about 20° to 550° C. for a period sufficient to incorporate about 0.01 to about 0.5 wt. % sulfur. The sulfide-producing compound utilized may be selected from the volatile sulfides, the mercaptans, the disulfides and the like compounds; however, best results are ordinarily obtained with hydrogen sulfide. The hydrogen sulfide may be utilized by itself or in admixture with a suitable carrier gas such as hydrogen, nitrogen or the like. Good results have been obtained at a temperature of 375° C. and a pressure of 100 psig. with a mixture of $H_2$ and $H_2S$.

Following this reduction step, or the optional sulfiding step, the hydrocarbon conversion process in which the catalyst is utilized may be restarted by once again charging the hydrocarbon stream in the presence of hydrogen to the zone containing the regenerated catalyst at conditions designed to produce the desired product. In the preferred case, this involves re-establishing reforming conditions within the zone containing the catalyst.

It is intended to cover by the following claims all changes and modifications of the above disclosure of the present invention that would be self-evident to a man of ordinary skill in the catalyst regeneration art.

I claim as my invention

1. A method for regenerating a deactivated hydrocarbon conversion catalyst which is a combination of a platinum group component, a rhenium component, a halogen component and a sulfur component with an alumina carrier material, the catalyst having been deactivated by deposition of carbonaceous materials thereon during a previous contacting with a hydrocarbon charge stock at hydrocarbon conversion conditions, said method comprising the sequential steps of:
   1. contacting the deactivated catalyst with a substantially sulfur-free first gaseous mixture consisting essentially of hydrogen, about 0.02 to about 3.6 mole % $H_2O$ and HCl -- the mole ratio of $H_2O$ to HCl contained therein being about 20:1 to about 100:1 -- at a temperature of about 350° to about 600°C. and at a pressure of about 1 to about 50 atmospheres for a period extending until the resulting effluent gas stream is substantially free of hydrogen sulfide;
   2. purging hydrogen from contact with the catalyst resulting from step (1) with an insert gas stream;
   3. subjecting the catalyst resulting from step (2) to contact with a substantially sulfur-free second gaseous mixture consisting essentially of an insert gas, $O_2$, $H_2O$, and HCl -- the amount of $O_2$ being about 0.2 to about 3 mole % thereof, the amount of $H_2O$ being about 0.03 to about 3.6 mole % thereof and the mole ratio of $H_2O$ to HCl contained therein being selected from the range of about 20:1 to about 100:1 -- at a temperature of about 375° to about 450°C. and at a pressure of about 7 to about 35 atmospheres for a period sufficient to substantially remove said carbonaceous materials;
   4. treating the catalyst resulting from step (3) with said second gaseous mixture for a period of at least about 0.5 to about 10 hours at a temperature of about 450° to about 550°C. and at a pressure of about 7 to about 35 atmospheres;
   5. purging oxygen from contact with the catalyst from step (4) with an inert gas stream; and,
   6. subjecting the catalyst resulting from step (5) to contact with a substantially sulfur-free third gaseous mixture consisting essentially of hydrogen, about 0.03 to about 3.6 mole % $H_2O$, and HCl -- the mole ratio of $H_2O$ to HCl contained therein being selected from the range of about 20:1 to about 100:1 -- at a temperature of about 300° to about 600°C. for a final period of at least about 0.5 to about 5 hours, thereby producing a regenerated hydrocarbon conversion catalyst having activity, selectivity, and stability characteristics comparable to those possessed initially by the fresh catalyst.

2. A method as defined in claim 1 wherein the platinum group component of the catalyst is platinum or a compound of platinum.

3. A method as defined in claim 1 wherein the halogen component of the catalyst is chlorine or a compound of chlorine.

4. A method as defined in claim 1 wherein said alumina carrier material is gamma- or eta-alumina.

5. A method as defined in claim 1 wherein said catalyst contains, on an elemental and carbonaceous material-free basis, about 0.1 to about 1.5 wt. % halogen, about 0.01 to about 1 wt. % platinum group metal, about 0.1 to about 1 wt. % rhenium, and about 0.05 to about 1 wt. % sulphur.

6. A method as defined in claim 1 wherein the mole ratio of $H_2O$ to HCl utilized in steps (1), (3), (4), and (6) is selected from the range of about 50:1 to about 90:1.

7. A method as defined in claim 1 wherein the temperature utilized in step (6) is about 325 to about 425° C.

8. A method as defined in claim 1 wherein the inert gas stream used in step (2) contains $H_2O$ and HCl in a mole ratio of about 20:1 to about 100:1.

9. A method as defined in claim 1 wherein step (4) comprises the substeps of:
   a. treating the catalyst resulting from step (3) with said second gaseous mixture for at least about 0.5 to about 5 hours at a temperature of about 450° to about 550° C. and at a pressure of about 7 to about 35 atmospheres; and thereafter,
   b. increasing the amount of $O_2$ contained in said second gaseous mixture by a factor of about 2 to about 50 and continuing the treating for at least about 0.5 to about 5 hours at the same temperature and pressure.

10. A method as defined in claim 1 wherein the amount of oxygen contained in the second gaseous mixture is about 0.5 to about 1.5 mole percent thereof.

11. A method as defined in claim 1 wherein the period of time utilized in step (1) extends at least until the resulting effluent gas stream contains less than 1 vol. ppm of $H_2S$.

12. A method as defined in claim 1 wherein the period of time utilized in step (3) extends at least until the differential temperature across the catalyst bed is less than 5° C.

13. A method of regenerating a deactivated hydrocarbon conversion catalyst which is a combination of a platinum group component, a rhenium component, a halogen component and a sulfur component with an alumina carrier material, the catalyst having been deactivated by deposition of carbonaceous materials thereon during a previous contacting with a hydrocarbon charge stock at hydrocarbon conversion conditions, said method comprising a combination of the method defined in claim 1 with the step of sulfiding the catalyst resulting from step (6) at a temperature of about 20° to 550°C. to result in a regenerated catalyst containing about 0.01 to about 0.5 wt.% sulfur.

* * * * *